US006937280B2

(12) United States Patent
Kawai et al.

(10) Patent No.: US 6,937,280 B2
(45) Date of Patent: Aug. 30, 2005

(54) ELECTRONIC DEVICE HAVING PIVOTAL DISPLAY AND STEREO SPEAKERS

(75) Inventors: Kenji Kawai, Tokyo (JP); Shigenobu Chichimatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 09/781,858

(22) Filed: Feb. 12, 2001

(65) Prior Publication Data

US 2001/0055071 A1 Dec. 27, 2001

(30) Foreign Application Priority Data

Feb. 15, 2000 (JP) ....................................... 2000-036610

(51) Int. Cl.[7] ................................................ H04N 5/222

(52) U.S. Cl. ........................... 348/333.06; 348/333.01; 348/340; 348/375; 396/383

(58) Field of Search ....................... 348/333.01, 333.06, 348/375, 340; 345/6, 649; 386/96

(56) References Cited

U.S. PATENT DOCUMENTS

| | | | | | |
|---|---|---|---|---|---|
| 5,396,301 | A | * | 3/1995 | Sasaki et al. | 348/794 |
| 5,739,859 | A | * | 4/1998 | Hattori et al. | 348/375 |
| 5,900,848 | A | * | 5/1999 | Haneda et al. | 345/1.1 |
| D435,575 | S | * | 12/2000 | Kanatani | D16/202 |
| 6,518,956 | B1 | * | 2/2003 | Sato | 345/173 |
| 6,549,237 | B1 | * | 4/2003 | Inuma et al. | 348/333.06 |
| 6,621,481 | B1 | * | 9/2003 | Kanbara | 345/100 |
| 6,704,495 | B1 | * | 3/2004 | Kumazawa et al. | 386/126 |
| 2003/0161484 | A1 | * | 8/2003 | Kanamori et al. | 381/71.7 |

FOREIGN PATENT DOCUMENTS

| | | | | |
|---|---|---|---|---|
| JP | 06161600 A | * | 6/1994 | G06F/1/16 |
| JP | 11-224059 | | 8/1999 | |
| JP | 2001-256768 | | 9/2001 | |

OTHER PUBLICATIONS

English translation of JPA 11–224059 in corresponding US 6,704,495 which was cited by Examiner in the Jul. 2, 2004 Office Action.

English Abstract of JPA 2001–256768.

* cited by examiner

*Primary Examiner*—Wendy R. Garber
*Assistant Examiner*—Gary C. Vieaux
(74) *Attorney, Agent, or Firm*—Morgan & Finnegan, LLP

(57) ABSTRACT

It is an object of this invention to properly output sounds in stereo at the time of reproducing of images in a video camera having a pivotal image display unit. The invention includes an image display unit which can pivot on an electronic device body and displays images, first and second sound output units, a detection unit for detecting pivoting operation of the image display unit, and a control means for controlling switching of sound signals output to the first and second sound output units upon pivoting operation of the image display unit.

6 Claims, 6 Drawing Sheets

F I G. 6A
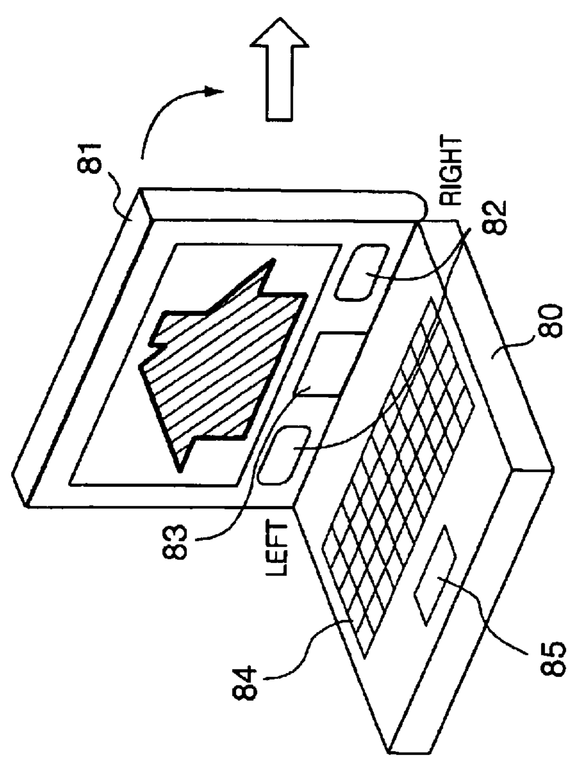
F I G. 6B
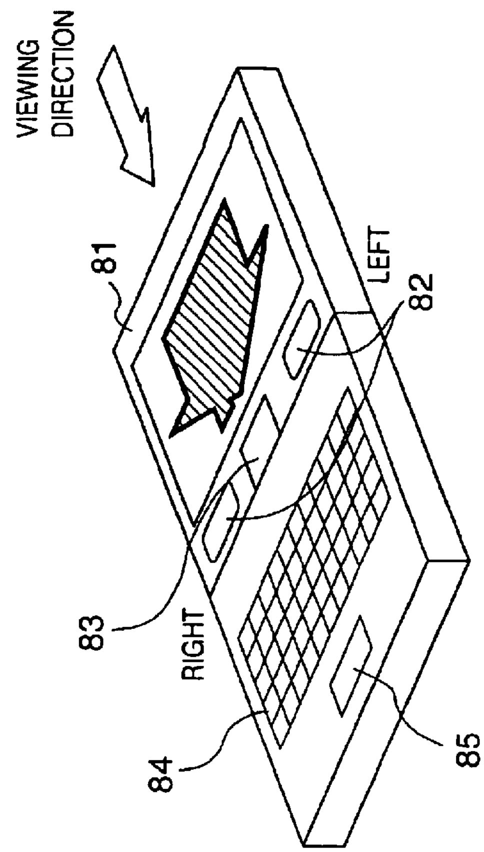

ELECTRONIC DEVICE HAVING PIVOTAL DISPLAY AND STEREO SPEAKERS

FIELD OF THE INVENTION

The present invention relates to an electronic device which has a display unit designed to pivot on the device body and sound output units such as speakers and can be suitably used for a video camera, notebook personal computer, or the like.

BACKGROUND OF THE INVENTION

A video camera as a typical electronic device which has become pervasive on the market has an image display unit formed by a liquid crystal display for displaying sensed images. This image display unit has a mechanism that is pivotal on the device body to allow a user to take an angle shot or check a sensed image of an object to be sensed.

In a video camera having such a pivotal image display unit, inversion processing is electrically performed to vertically invert an image signal displayed on the image display unit in accordance with its rotational angle so as to prevent a displayed image from being displayed in an inverted position upon rotation of the image display unit.

There are needs on the market for an improvement in the quality of sound recorded together with sensed images as well as an improvement in image quality. To meet the needs, a video camera designed to record sounds in stereo becomes popular.

A video camera having a pivotal image display unit like the one described above, in outputting a sound in stereo at the time of reproducing of an image, when the image signal is inverted, the stereo sound output does not match with the image.

SUMMARY OF THE INVENTION

It is an object of the present invention to solve the above problem.

In order to achieve the above object, according to an embodiment of the present invention, there is provided an electronic device comprising a display panel for displaying an image based on image data stored in a storage medium, first and second sound output units for outputting sounds in stereo on the basis of sound data stored in the storage medium, a pivoting member for pivoting the display panel, a detection member for detecting that a display screen of the display panel is physically set in a predetermined direction by pivoting operation of the pivoting member, and a control unit for outputting a sound, which is to be output from the first sound output unit, from the second sound output unit, and outputting a sound, which is to be output from the second sound output unit, from the first sound output unit when the detection member detects that the display screen of the display panel is set in the predetermined direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A and 6B are perspective views of a notebook PC according to this embodiment.

DETAILED DESCRIPTION OF THE PREFERRED EMBODIMENT

An embodiment of the present invention will be described below with reference to the accompanying drawings.

Figure 1:
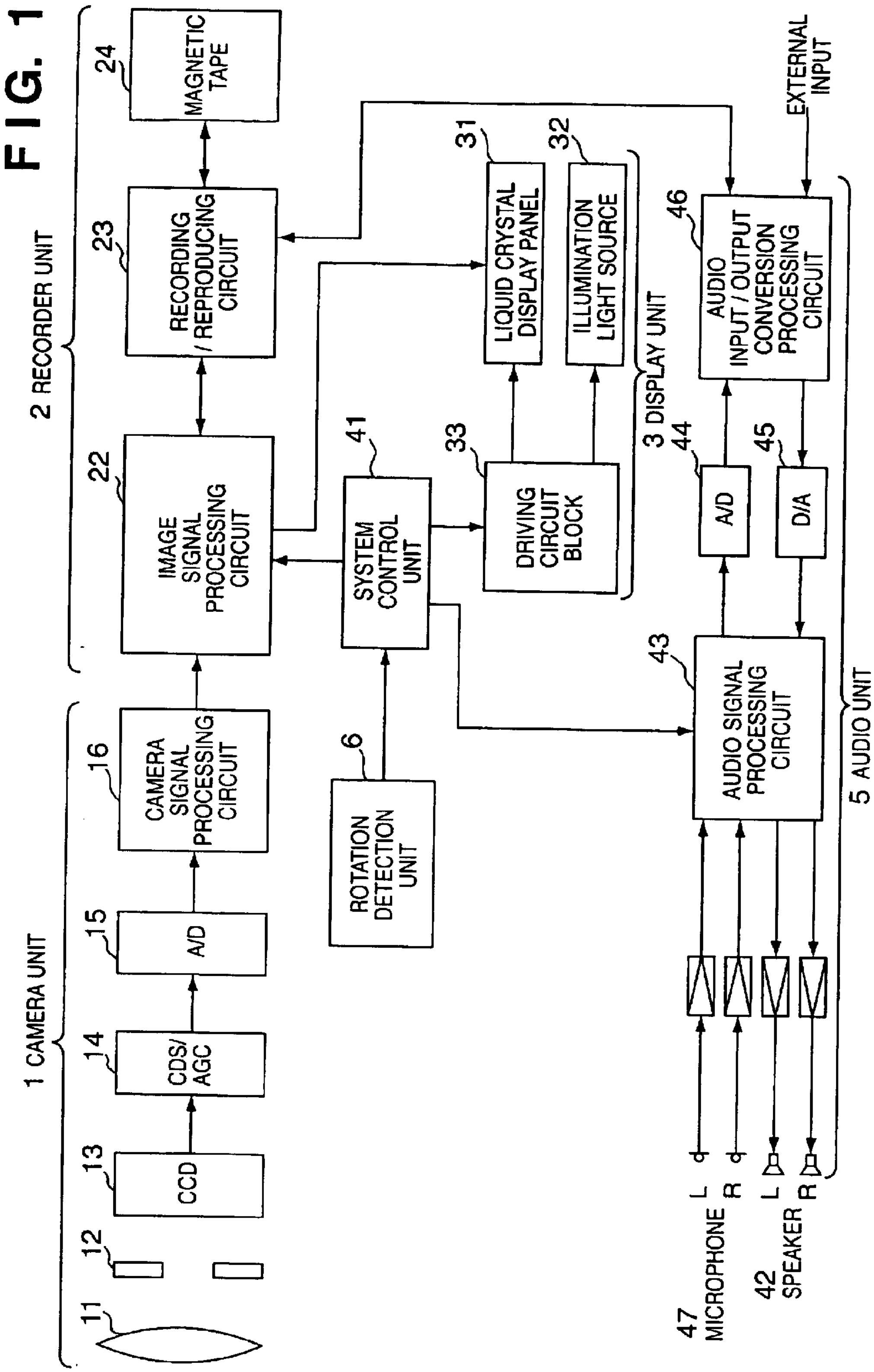
FIG. 1 is a block diagram showing a video camera according to an embodiment.

FIG. 1 is a block diagram of a video camera which is an electronic device according to this embodiment.

A camera-unit 1 is comprised of an image-sensing lens 11, auto iris 12, CCD 13, CDS/AGC circuit 14, A/D converter 15, and camera signal processing circuit 16. The CCD 13 converts an optical image, which is formed by the image-sensing lens 11 and subjected to light amount adjustment in the auto iris 12, into an electrical signal.

The CDS/AGC circuit 14 performs double-correlation sampling of the output image signal from the CCD 13 and automatically adjusts the gain of the signal. The A/D converter 15 converts the resultant signal into a digital signal and supplies it to the camera signal processing circuit 16. The camera signal processing circuit 16 performs known processing such as $\gamma$ correction, color balance adjustment, and luminance/color difference conversion for the output signal from the CDS/AGC circuit 14, and supplies the resultant signal to a recorder unit 2.

The recorder unit 2 is comprised of an image signal processing circuit 22, recording/reproducing circuit 23, and magnetic tape 24 as a recording medium. The image signal processing circuit 22 performs DCT processing, quantization, variable-length coding, and image signal processing including image compression processing for a video signal from the camera signal processing circuit 16 in the camera unit 1, and supplies the resultant signal to the recording/reproducing circuit 23 and a display unit 3. In the reproducing mode, a reproducing video signal is supplied from the recording/reproducing circuit 23 to the display unit 3.

In the recording mode, the recording/reproducing circuit 23 performs channel coding for the video signal from the image signal processing circuit 22 while adding an error correction code to the signal, and records the resultant signal on the magnetic tape 24. In the reproducing mode, the recording/reproducing circuit 23 produces the recorded signal from the magnetic tape 24, decodes it, and performs error correction. The recording/reproducing circuit 23 then supplies the reproducing video signal to the image signal processing circuit 22. The image signal processing circuit 22 decompresses the compressed image signal.

The display unit 3 is comprised of a liquid crystal display panel 31, an illumination light source 32 for illuminating the liquid crystal display panel 31 from the back side, and a driving circuit block 33 for driving the illumination light source 32. The liquid crystal display panel 31 is compatible with a wide screen having an aspect ratio of 9:16 as well as a general screen having an aspect ratio of 3:4. The liquid crystal display panel 31 may use one of the following: a simple-matrix TN liquid crystal, STN liquid crystal, FLC (Ferroelectric Liquid Crystal), active-matrix MIM, amorphous Si-TFT, high-temperature poly-Si-TFT, and lowtemperature poly-Si-TFT. A diffusion plate may be formed on the upper surface of the liquid crystal display panel 31.

An audio unit 5 is comprised of microphones 47 for inputting sounds, speakers 42 for outputting sounds, an audio signal processing circuit 43 for processing audio signals from the microphones 47 and to speakers 42, an A/D converter 44, a D/A converter 45, and an audio input/output conversion processing circuit 46. As each microphone 47, an omnidirectional microphone is generally used. However, a gradient microphone (bidirectional) or intermediate type microphone (unidirectional) may be used.

As a conversion mechanism for converting the movement of a diaphragm used in each speaker 42 into electric energy, an electrodynamic (dynamic) speaker whose output voltage is proportional to the vibrating speed of the diaphragm, an electrostatic speaker whose output voltage is proportional to the vibration displacement of the diaphragm, a piezoelectric speaker, a carbon speaker, or the like is available.

The electrodynamic speaker includes a moving coil speaker and ribbon speaker. The moving coil speaker is robust and easy to handle, has a wide dynamic range, and exhibits high conversion efficiency. For this reason, this speaker has become mainstream. The ribbon speaker has good frequency characteristics but is susceptible to mechanical stress. The electrostatic speaker includes an electret condenser speaker, which has excellent frequency characteristics and requires an impedance conversion circuit although it requires no bias source. The piezoelectric speaker includes a crystal speaker, which is compact and lightweight but deteriorates in characteristics at a high temperature and high humidity although it has a high impedance. The carbon speaker has high sensitivity but suffers much noise and instability.

This embodiment uses two speakers 42 for stereo sounds. Assume that each speaker 42 in this embodiment is a dynamic moving coil speaker and comprised of a magnetic circuit, voice coil, and vibration system. The dynamic speaker is characterized in that it has a simple structure and exhibits excellent characteristics and high conversion efficiency. For this reason, this speaker has become mainstream.

A system control unit 41 is formed by a microcomputer such as a CPU, and controls the camera unit 1, the recorder unit 2, the display unit 3, the audio unit 5, and a rotation detection unit 6.

The rotation detection unit 6 detects that the display unit 3 is rotated and positioned at a predetermined angle, and sends information indicating this state to the system control unit 41, thereby instructing the image signal processing circuit 22 to perform vertical/horizontal inversion processing for a picture to be displayed. In addition, when the rotation detection unit 6 detects that the display unit 3 is rotated and positioned at a predetermined angle, left and right sound outputs from the speakers 42 are interchanged and switched.

Figure 2:
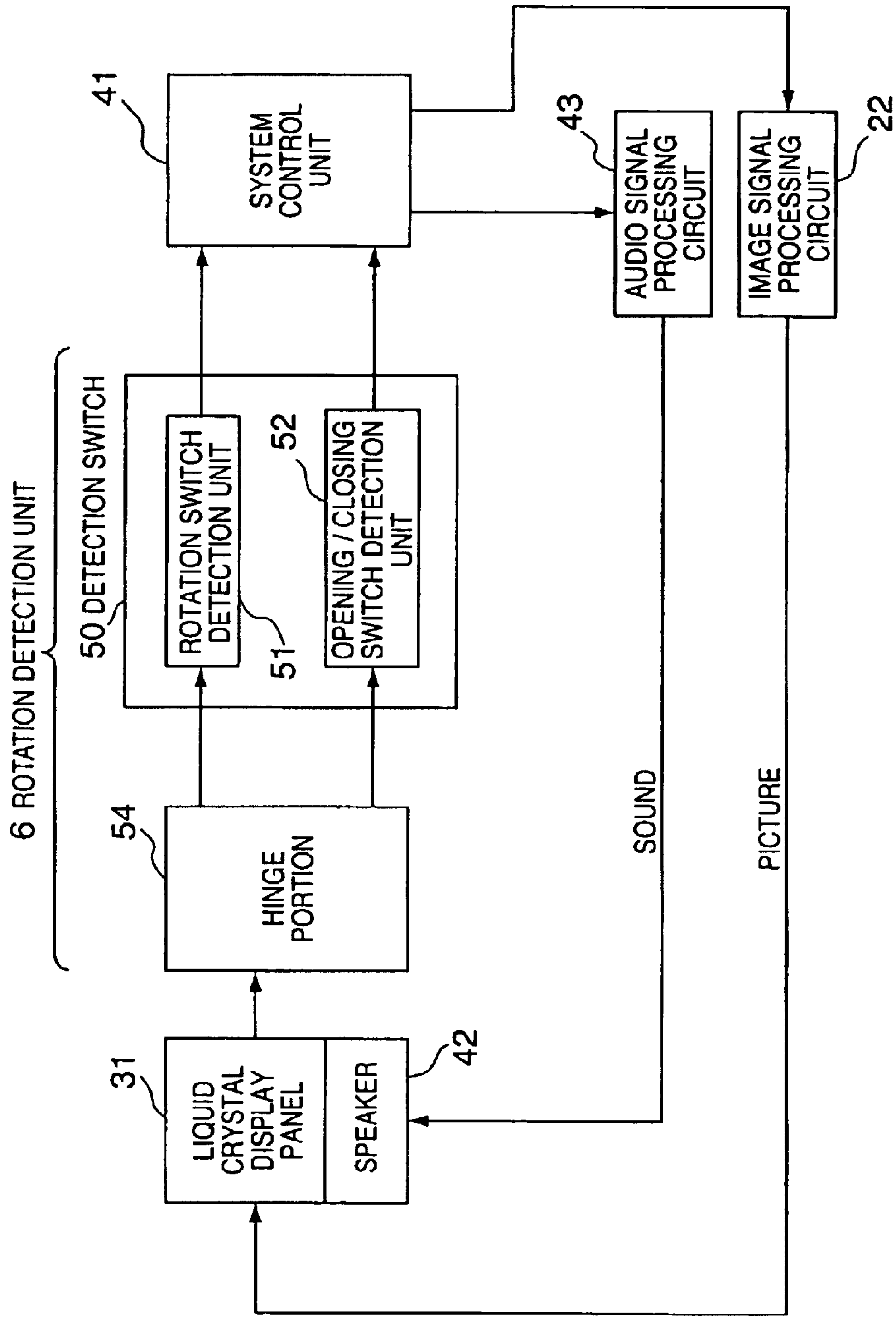
FIG. 2 is a block diagram showing a portion for performing video/sound reproducing processing in the video camera according to this embodiment.

FIG. 2 is a block diagram showing the detailed arrangement associated with the detection of the rotation of the liquid crystal display panel 31.

Referring to FIG. 2, a hinge portion 54 is a movable member that allows the liquid crystal display panel 31 to rotate relative to the device body. A detection switch 50 is comprised of a rotation switch detection unit 51 for detecting the rotation of the liquid crystal display panel 31 and an opening/closing switch detection unit 52 for detecting that the liquid crystal display panel 31 is rotated from the withdrawn state to the open state with respect to the device body to allow the user to see the screen.

When the liquid crystal display panel 31 is rotated, and the-detection switch 50 detects that the display screen is set in the display position to be described later, the system control unit 41 instructs the image signal processing circuit 22 to perform vertical/horizontal inversion processing for a picture to be displayed on the liquid crystal display panel 31. In the reproducing mode, when the detection switch 50 detects that the liquid crystal display panel 31 is rotated, the system control unit 41 instructs the audio signal processing circuit 43 to invert left and right sound outputs from the speakers 42 before the rotation of the liquid crystal display panel 31 is detected by the detection switch 50.

Figure 3:
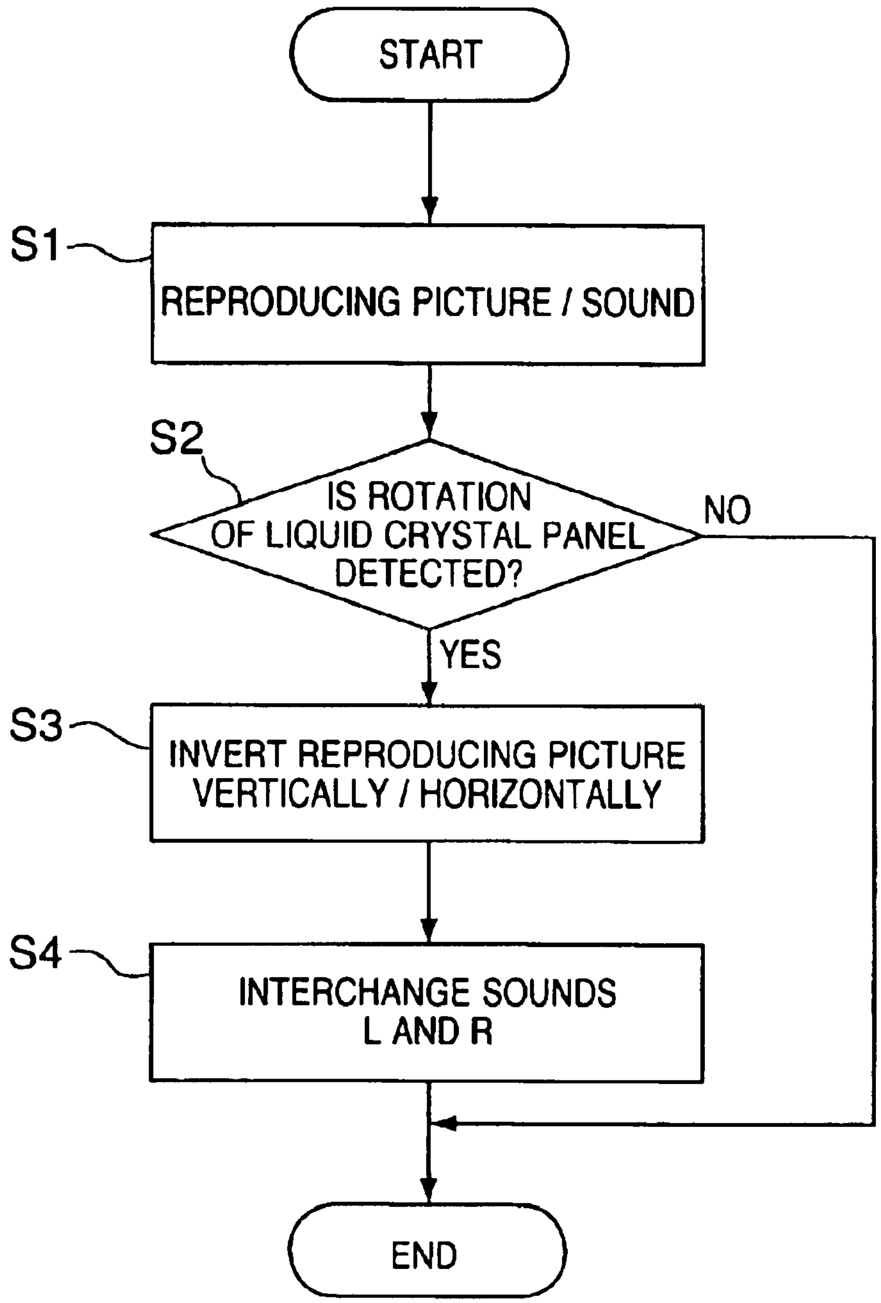
FIG. 3 is a flow chart showing reproducing processing in the video camera according to this embodiment.

FIG. 3 is a flow chart showing reproducing processing for an image and sound in the system control unit 41. FIGS. 4A to 4E are perspective views showing the outer appearance of the video camera according to this embodiment. Referring to FIGS. 4A to 4E, the liquid crystal display panel 31 for displaying sensed images is attached to a side surface of a video camera body 60. The speakers 42 are integrally fixed on the two end portions of the liquid crystal display panel 31. The speakers 42 respectively have an L channel (Left) and R channel (Right). The stereo microphones 47 are located on the front surface of the video camera body 60.

Reproducing processing for an image and sound in this embodiment will be described with reference to FIGS. 3 to 4E.

Figures 4A, 4B, 4C, 4D, 4E:
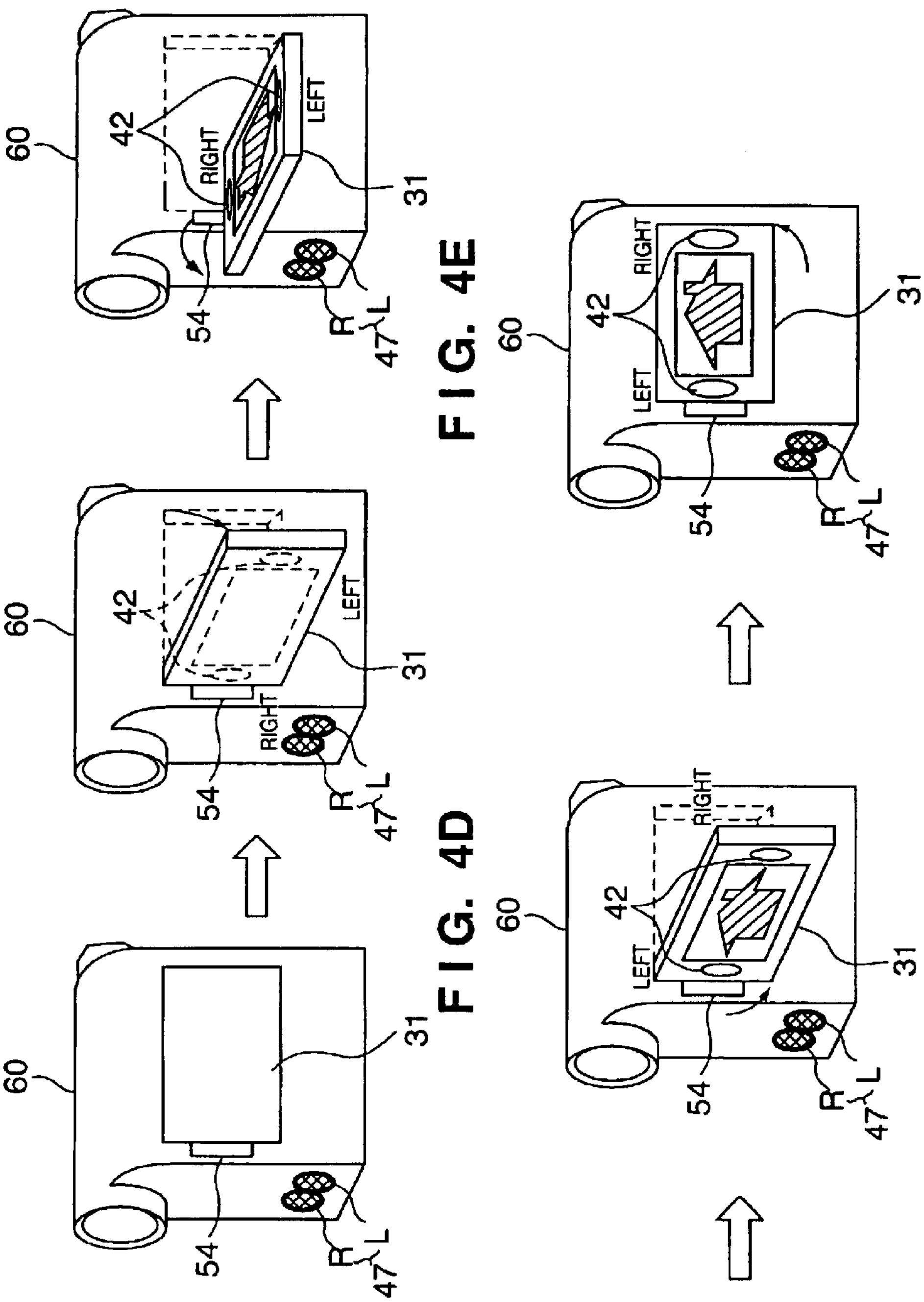
FIGS. 4A to 4E are perspective views of the video camera according to this embodiment.

First of all, as shown in FIG. 4A, the liquid crystal display panel 31 is in the withdrawn state. When the user is to check a sensed image by using the liquid crystal display panel 31, he/she opens the liquid crystal display panel 31, as shown in FIG. 4B. At this time, the video signal and stereo signal are normally reproduced (step S1).

When the liquid crystal display panel 31 performs predetermined rotating operation, as shown in FIGS. 4C and 4D, the rotation detection unit 6 detects the predetermined rotating operation which rotates the liquid crystal display panel 31 more than a predetermined angle around hinge portion 54 (step S2). If the predetermined rotating operation of the liquid crystal display panel 31 is not detected, the processing in steps S3 and S4 is not performed.

When the predetermined rotating operation of the liquid crystal display panel 31 is detected, the system control unit 41 instructs the image signal processing circuit 22 to perform vertical/horizontal inversion processing for a picture to be displayed on the liquid crystal display panel 31, as shown in FIGS. 4D and 4E (step S3). In addition, when the predetermined rotating operation of the liquid crystal display panel 31 is detected, the system control unit 41 instructs the audio signal processing circuit 43 to interchange and switch audio signals to be output to the L and R channels of the speakers 42 (step S4).

As described above, according to this embodiment of the present invention, in accordance with the rotating operation of the liquid crystal display panel 31, audio outputs to the left and right stereo speakers are interchanged. This makes it possible to properly reproduce a picture and sound.

In this embodiment, as a recording medium, a tape-like magnetic medium is used. However, the present invention can be applied to a reproducing device using a disk or semiconductor memory as a recording medium.

The present invention can also be applied to a DVD player which integrally has a liquid crystal display monitor and reproduces DVD video software, which is designed to rotate the liquid crystal display panel for displaying images, make itself compact, and reproducing pictures.

FIGS. 5A to 5E are perspective views of a portable DVD (Digital Video Disk) device to which this embodiment is applied.

Referring to FIGS. 5A to 5E, a housing portion 70 is used to house a DVD as a storage medium. A liquid crystal display panel 71 is used to reproduce/display pictures recorded on the DVD. Stereo speakers (Left, Right) 72 are fixed to the liquid crystal display panel 71. A hinge portion 73 allows a user to open/close the liquid crystal display panel 71 with respect to the device body. An operation button group 74 is arranged on the front surface of the device body and used to reproduce and stop pictures and sounds, adjust the brightness of pictures, and adjust the volume level.

Figures 5A, 5B, 5C, 5D, 5E:
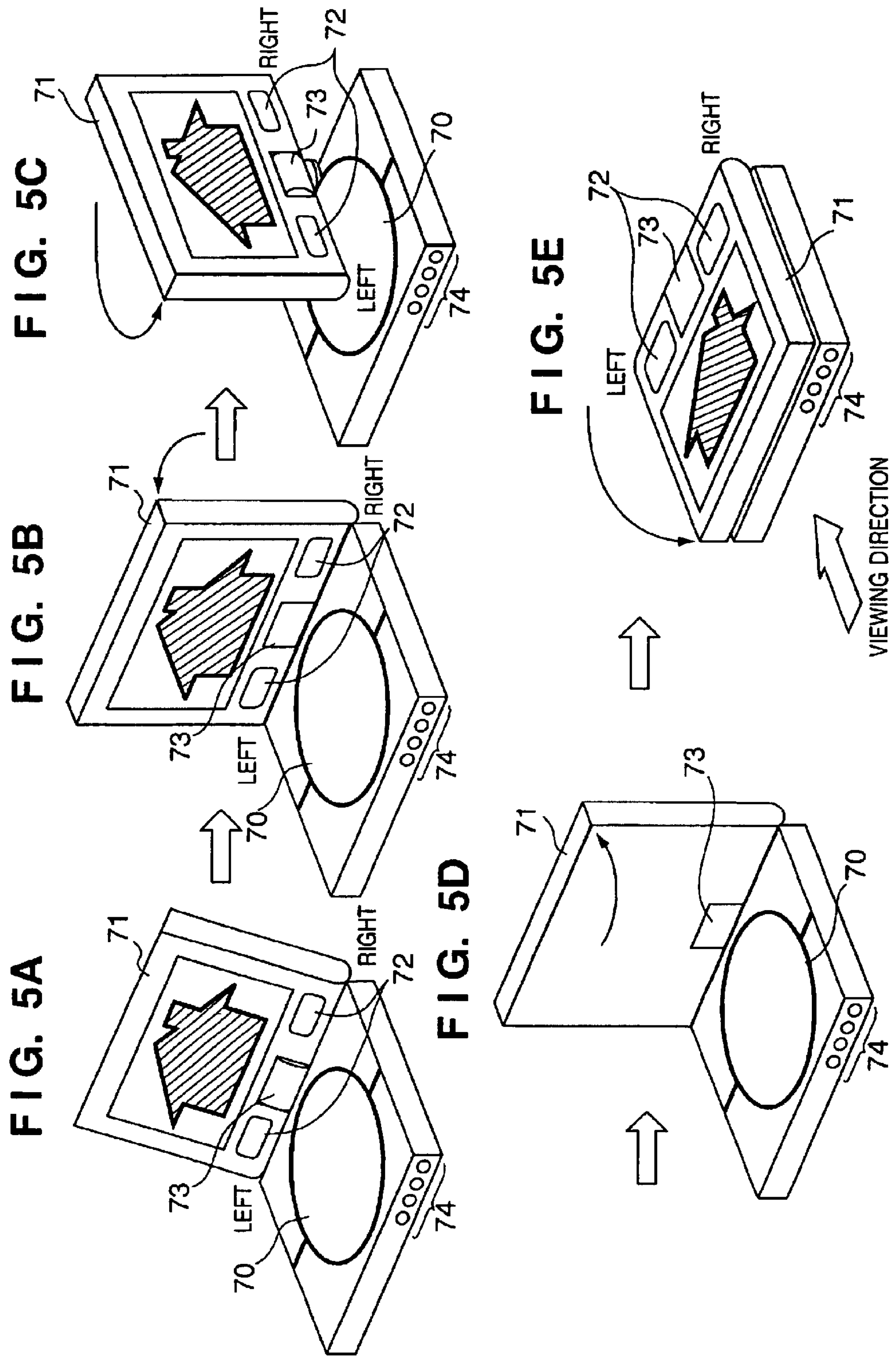
FIGS. 5A to 5E are perspective views of a DVD player according to this embodiment.

FIG. 5A is a view showing a standard reproducing state of the DVD device of this embodiment. A case wherein the DVD device is switched from the state shown in FIG. 5A to the state shown in FIG. 5E will be described. First of all, as shown in FIG. 5B, the liquid crystal display panel 71 is moved to an upright position from the state where the display screen of the liquid crystal display panel 71 is closed, facing the device body. As shown in FIGS. 5C and 5D, the liquid crystal display panel 71 is rotated through 180° about the hinge portion 73. When a rotation detection unit (not shown) detects that the liquid crystal display panel 71 is rotated to become physically parallel to the panel support surface of the device body and allow the user to see the display screen of the liquid crystal display panel 71, a system control unit (not shown) performs vertical/horizontal inversion processing for a picture to be displayed with respect to the state shown in FIG. 5A, as shown in FIG. 5E. In addition, when the rotation of the liquid crystal display panel 71 is detected, left and right sound outputs from the stereo speakers 72 are interchanged and output. With this arrangement, pictures and sounds can be properly reproduced without making the operation of the operation members difficult.

FIG. 6 shows an example of how this embodiment is applied to a notebook PC (Personal Computer).

Referring to FIG. 6, reference numeral 80 denotes a PC body. A liquid crystal display panel 81 serves to reproduce/display a picture recorded on a DVD. Stereo speakers (Left, Right) 82 are fixed to the liquid crystal display panel 81. A hinge portion 83 allows the liquid crystal display panel 81 to pivot about a predetermined side of the PC body 80 through about 180° from the state where the display screen of the liquid crystal display panel 81 is closed on the receiving surface of the PC body. Reference numeral 84 denotes a keyboard; and 85, a pointing device for moving the cursor displayed on the liquid crystal display panel 81.

FIG. 6A shows how the PC body 80 is normally used. When the liquid crystal display panel 81 is pivoted about the hinge portion 83 through about 180° from the state shown in FIG. 6A, in which the liquid crystal display panel 81 is closed with respect to the PC body 80, in the direction indicated by the arrow, as shown in FIG. 6B, a detection unit (not shown) detects the pivoting movement of the liquid crystal display panel 81, a picture is vertically/horizontally inverted to be seen as a normal picture when viewed by a person who is facing a user (in the direction indicated by the arrow in FIG. 6B). In addition to the picture, left and right sound outputs L and R from the speakers 82 are interchanged to be output at normal positions.

According to such a form of the PC body 80, when, for example, a salesman explains something to a person who is facing the salesman, pictures and sounds which the person facing the salesman can see without any sense of incongruity can be reproduced by simply tilting the liquid crystal display panel 81 and directing it toward the person.

As has been described above, according to this embodiment, when the liquid crystal display panel is rotated, left and right sounds from the stereo speakers are interchanged. This makes it possible to provide an electronic device which can always properly reproduce pictures displayed in any reproducing form and sound outputs.

The object of each of the embodiments described above can be attained by providing an electronic device with program codes of software for realizing the functions of each embodiment via a network, and by arranging the computer (or a CPU or an MPU) of the system or the apparatus to read and execute the program codes stored in a storage medium.

In this instance, the program codes read out from the storage medium are arranged to realize the functions of each of the embodiments described above. Then, the storage medium is included also in the embodiments.

The storage medium which stores the program codes may be selected, for example, from among storage media such as a floppy disk, a hard disk, an optical disk, a magneto-optical disk, a CD-ROM, a CD-R, a magnetic tape, a nonvolatile memory card, and a ROM.

The embodiments also apply to such cases where not only the functions of the embodiments described above are realized by executing the program codes read out by a computer but also processes required for the functions are executed, in accordance with the instructions of the program codes, either in part or in their entirety by an operating system (OS) operating on the computer.

The embodiments further also applies to a case where the program codes read out from a storage medium are written into a memory provided either on a function expanding board inserted in a computer or included in a function expanding unit connected to a computer, and, after that, processes required for the functions are executed, in accordance with the instructions of the program codes, either in part or in their entirety by a CPU or the like provided on the function expanding board or the function expanding unit.

When the embodiments are applied to the above-described storage medium, program codes corresponding to the above-described flow chart are stored in the storage medium. That is, a module indispensable for the electronic device of the present embodiment is stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An electronic device comprising:

a display panel for displaying an image;

first and second sound output units for outputting sounds in stereo in response to displaying the image;

a pivoting member for pivoting said display panel;

a detection member for detecting that a display screen of said display panel is physically set in a predetermined direction by a pivoting operation of said pivoting member; and a control unit for reversing an image and a sound in response to an output signal of said detection member, wherein said control unit outputs a sound, which is to be output from said first sound output unit, from second sound output unit, and outputs a sound, which is to be output from said second sound output unit, from said first output unit when the display screen of said display panel becomes substantially parallel to a panel support surface of said electronic device on which said display panel is supported and set in a direction in which the display screen of said display panel can be seen.

2. The device according to claim 1, wherein said first sound output unit is an L-channel speaker, and said second sound output unit is an R-channel speaker.

3. The device according to claim 1, wherein a display screen of said display panel is a liquid crystal display.

4. The device according to claim 1, further comprising an operation member which is arranged on a front surface of a body of said electronic device to operate said electronic device.

5. A method of controlling an electronic device for outputting first and second sound signals in response to displaying an image, said method comprising:

a detection step of detecting that a display screen for displaying the image is physically set in a predetermined direction by a pivoting operation;

a controlling step of automatically reversing an image and a sound in response to a signal output in said detection step;

wherein, in said controlling step said first sound signal, which is to be output from first sound output unit, is output from second sound output unit, and said second sound signal, which is to be output from said second sound output unit, is output from said first sound output unit when the display screen of said display panel becomes substantially parallel to a panel support surface of said electronic device on which said display panel is supported and set in a direction in which the display screen of said display panel can be seen.

6. A method according to claim 5, wherein said electronic device comprises an operation member which is arranged on a front surface of a body of said electronic device to operate said electronic device.

* * * * *